United States Patent
Veneruso

(10) Patent No.: US 12,522,119 B2
(45) Date of Patent: Jan. 13, 2026

(54) DEPLOYABLE TRAY TABLE

(71) Applicant: GEVEN S.P.A., Nola (IT)

(72) Inventor: Alberto Veneruso, Nola (IT)

(73) Assignee: GEVEN S.P.A., Nola (IT)

( * ) Notice: Subject to any disclaimer, the term of this patent is extended or adjusted under 35 U.S.C. 154(b) by 225 days.

(21) Appl. No.: 18/208,486

(22) Filed: Jun. 12, 2023

(65) Prior Publication Data

US 2024/0166111 A1    May 23, 2024

(51) Int. Cl.
*B60N 3/00* (2006.01)
*B60N 3/10* (2006.01)
*B60R 11/02* (2006.01)
*B64D 11/06* (2006.01)
*B60R 11/00* (2006.01)

(52) U.S. Cl.
CPC ............ *B60N 3/004* (2013.01); *B60N 3/102* (2013.01); *B60R 11/02* (2013.01); *B64D 11/0638* (2014.12); *B60R 2011/0015* (2013.01)

(58) Field of Classification Search
CPC .... B60N 3/004; B60N 3/102; B64D 11/0638; B60R 11/02; B60R 2011/0015
See application file for complete search history.

(56) References Cited

U.S. PATENT DOCUMENTS

| | | | | |
|---|---|---|---|---|
| 3,773,381 A * | 11/1973 | Brennan | ............... | B29C 31/004 108/45 |
| 4,159,071 A | 6/1979 | Roca | | |
| 5,092,652 A * | 3/1992 | Macaluso | ............... | A47B 13/16 108/26 |
| 5,720,515 A | 2/1998 | Haffner | | |
| 7,073,449 B2 * | 7/2006 | Pipkin | ................ | B64D 11/0638 108/9 |
| 9,180,805 B2 * | 11/2015 | Millan | .................... | B60N 3/004 |
| 9,610,879 B2 * | 4/2017 | Zheng | ..................... | B60R 11/00 |
| 9,751,630 B1 * | 9/2017 | Melton | .................. | A47C 7/622 |
| 10,308,362 B2 * | 6/2019 | Trimble | ............. | B64D 11/0638 |
| 10,329,019 B2 * | 6/2019 | Noske | ................... | B60N 2/0264 |
| 11,186,372 B2 * | 11/2021 | Drenzeck | ........... | B64D 11/0636 |
| 2017/0166141 A1 * | 6/2017 | Pajic | ...................... | H02J 7/0044 |
| 2021/0039793 A1 * | 2/2021 | Vipula | .............. | B64D 11/00155 |
| 2023/0182632 A1 * | 6/2023 | Mansouri | ............... | F16M 11/10 297/163 |

FOREIGN PATENT DOCUMENTS

| | | |
|---|---|---|
| DE | 4340189 A1 | 6/1995 |
| FR | 3009814 A1 | 2/2015 |
| GB | 2519599 A | 4/2015 |
| WO | 2019156846 A1 | 8/2019 |

* cited by examiner

*Primary Examiner* — David R Dunn
*Assistant Examiner* — Jessica Kathryn Thompson
(74) *Attorney, Agent, or Firm* — Volpe Koenig

(57) ABSTRACT

A deployable tray table, of the type revolvingly constrained to a support and movable between a horizontal operating position and an upwardly rotated position, comprises a distal portion, near to the support, and a proximal portion which are placed side by side and adjacent, divided by a separation in which adjacent edges of the two portions are joined by means of respective hinges, so that the proximal portion could rotate by 180° from a folded position in a configuration with reduced overall dimensions, in which said hinges comprise each one a respective hinge pin retractable in the respective portion, so as to be able to disengage and separate the proximal portion from the distal portion.

12 Claims, 4 Drawing Sheets

DEPLOYABLE TRAY TABLE

FIELD OF THE INVENTION

The present invention relates to a deployable tray table, of the type which is revolvingly constrained to a support which, by way of example, can consist of the rear surface of a seat backrest, as it happens, for example, in the field of the seats for vehicles such as trains, buses and in particular aircrafts, arranged in several rows, but not limitedly to this field.

CONTEXT OF THE INVENTION

The deployable tray tables on the back of the seats which, in vehicles such as aircrafts, are arranged side by side in rows, are well known and they are largely part of consolidated habits of each passenger.

The tray table can even be constrained to a fixed seat, for example of the type used in stalls or waiting rooms, or to a vertical wall facing the sitting portion of a user.

The tray table according to the present invention then is a deployable tray table hinged thereto and movable between a horizontal operating position and a hidden position, generally but not exclusively rotated upwards, in which it adheres to its support.

The invention in particular relates to a deployable tray table divided into two portions, a distal one with respect to a possible user, and near to the support, and a proximal one, that is oriented towards a possible user, which are hinged to each other at a separation thereof, with the proximal portion which can be rotated by 180° from a folded position, in a configuration with reduced overall dimensions, to an extended operating position wherein the two operating portions are aligned and form one single plane.

The separation is conventionally defined hereinafter as longitudinal, that is by following a straight line oriented according to the greatest length of the tray table, substantially parallel to its support.

The configuration with reduced overall dimensions is meant to be provided to leave more space between the support of the tray table and the sitting portion thereon there is the user, but it is meant as such so as to provide in any case operativity to the tray table.

In the folded position, the surface of the proximal portion which faces upwards could constitute, in turn, an additional resting plane, reduced with respect to the one formed by both aligned portions.

Cup-holding devices and inserts or supports can even be arranged, both on the plane formed by the two aligned and adjacent portions, and on the plane formed in the configuration of less overall dimension, to arrange a portable electronic device (PED), that is a smartphone or tablet.

A deployable tray table of the above-described type is described in the International patent application Nr. WO 2019/156846 A1.

However, this type of tray tables requires more cleaning and maintenance, made uncomfortable by the separation which divides the two portions. Moreover, even the replacement of the proximal portion, which is intended to receive advertising images or the like, could require disassembly of the entire tray table.

SUMMARY OF THE INVENTION

The technical problem underlying the present invention is to provide a deployable tray table allowing to obviate the drawbacks mentioned with reference to the known art, meanwhile by implementing the above-described objects.

Such problem is solved by a deployable tray table as specified previously and as defined by the enclosed claim 1.

In the deployable tray table according to the invention, the proximal portion, which is the one which is nearest to the related passenger in one of the use configurations, can be rotated from a folded position, wherein it is adhered on the distal upper face of the distal portion, to an operating position, wherein the faces of the distal and proximal portions are uncovered and form one single plane.

Moreover, the proximal portion can provide an additional resting plane in the above-described configuration with reduced overall dimensions, in case by providing a respective cup-holding cavity and a support for tablet or smartphone.

The main advantage of the deployable tray table according to the present invention lies in the fact of being able to assume two different use configurations and being able to separate, if necessary, simply and quickly, the two deployable portions forming it.

This can take place for cleaning, maintenance or replacement reasons, or still to lighten the structure of the tray table.

BRIEF DESCRIPTION OF THE DRAWINGS

The present invention will be described hereinafter according to a preferred embodiment, provided by way of example and not for limitative purposes with reference to the enclosed drawings, wherein.

DESCRIPTION OF PREFERRED EMBODIMENTS OF THE INVENTION

Figure 1:
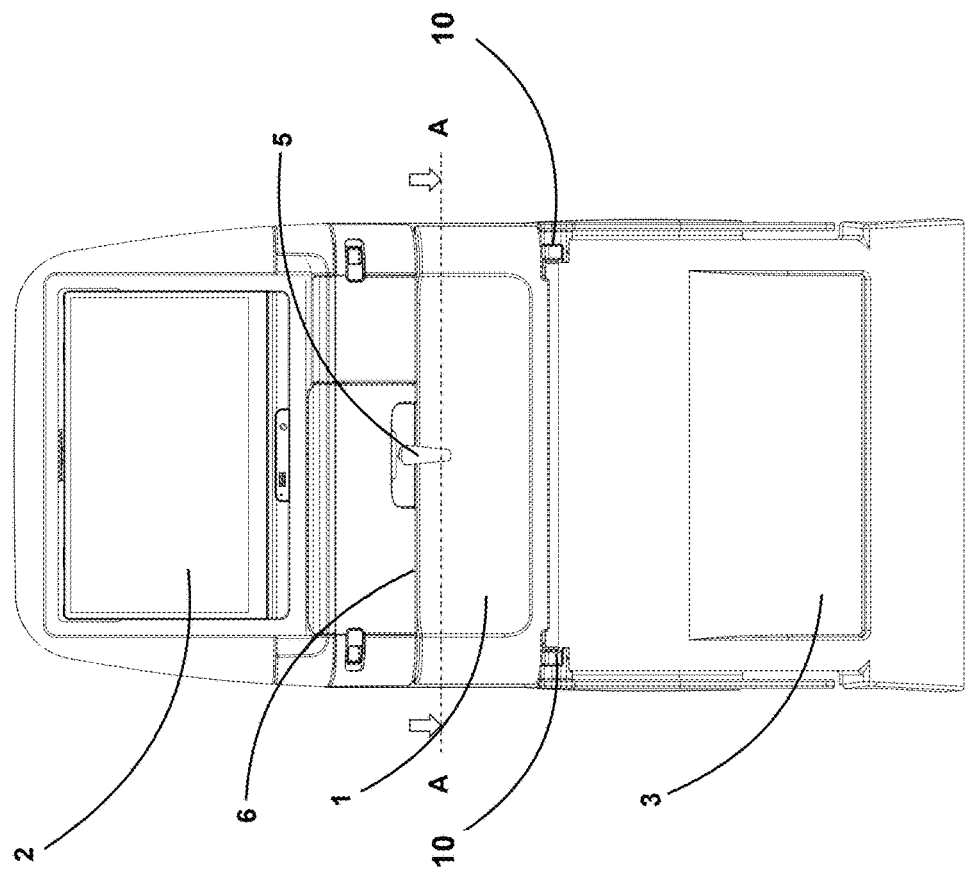
FIG. 1 shows a raised side view of an aeronautical seat, in the backrest thereof a deployable tray table according to the invention in configuration adhered to the backrest is provided.
Figure 2:
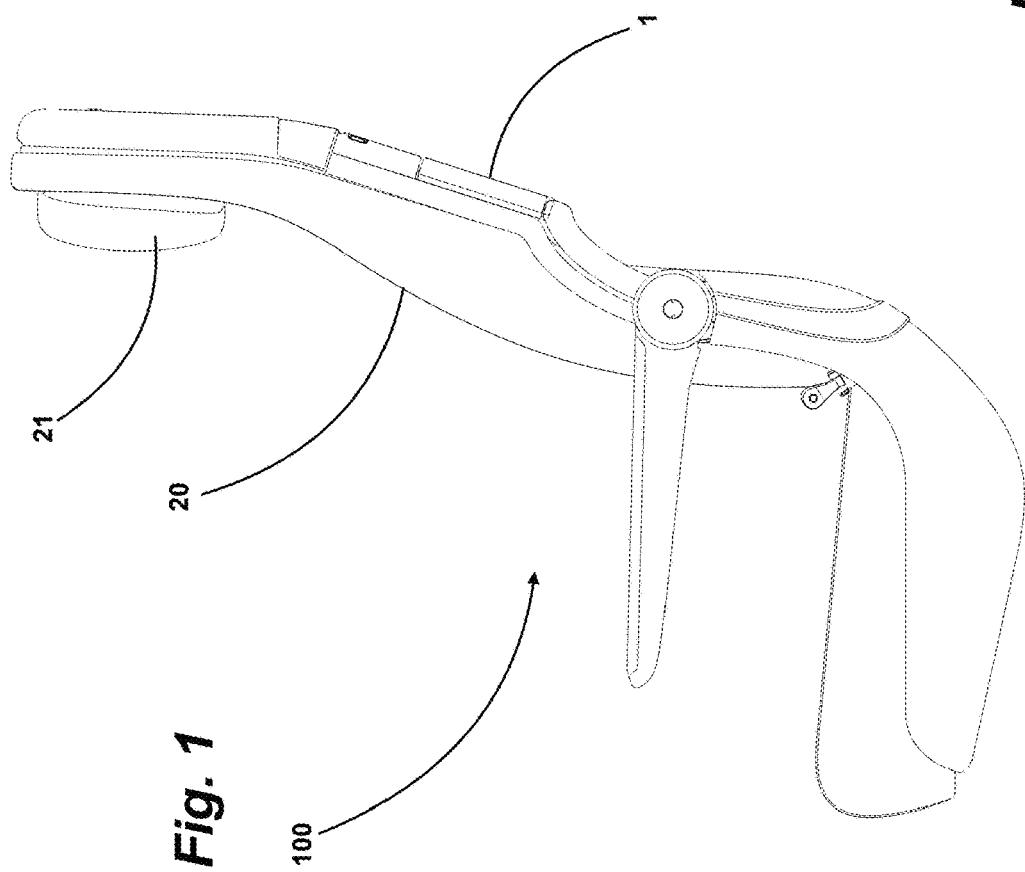
FIG. 2 shows a raised front view of the rear side of the backrest of the seat of FIG. 1, with the deployable tray table in the same configuration.
Figure 3:
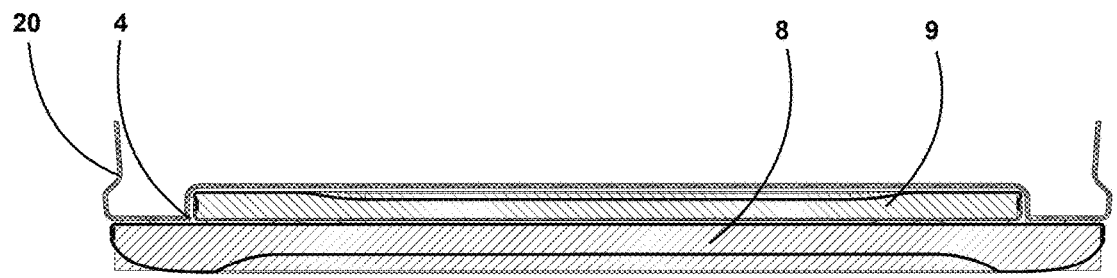
FIG. 3 shows an enlarged cross section of a detail of the deployable tray table of the present invention, taken according to plane A-A of FIG. 2.

With reference to the figures, a deployable tray table is designated with 1; it is integrated in the rear side of a backrest 20 of a seat 100 generally acting as vertical support of the tray table.

This kind of tray table is commonly used in seats of vehicles, in particular aeronautical seats, often arranged on several side-by-side rows, such as the one which is described.

However, it is meant that this tray table can be incorporated to a supporting surface in turn in front of a seat occupied by a user, or in a seat on board any vehicle such as trains or buses, or even in other contexts, such as stadiums, cinema halls, conference halls and so on.

In particular, in the present embodiment example, the deployable tray table 1 is hinged so as to be embedded on the rear side of the backrest 20 between a panel 2 or service monitor in upper position, corresponding to the headrest 21 of the seat 20, and a document pocket 3, which is in the position underneath; it is adhered to the backrest 20 in a position corresponding to a recess 4 formed on the surface of the rear side, and it is provided with a revolving locking system 5 of the hook-like type, which can be actuated manually, which locks an upper margin thereof 6, and a hinge 10 which constraints it revolvingly to the backrest, so that it can be rotated between a horizontal operating position, in which the tray table 1 is useful to rest any object compatible thereto, and a hidden position rotated upwards, substantially vertical, in which the upper margin 6 is locked.

The recess 4 has a prefixed width, the function thereof will be explained hereinafter, and preferably rounded edges.

The tray table 1 is divided longitudinally into two side-by-side and adjacent portions, in particular a distal portion 8, which is the one directly hinged to the backrest 20 and then it is the farthest one from its reference user, and a proximal portion 9, which is then the nearest one in a use configuration of maximum extension.

These portions are divided by a longitudinal separation 11, formed by the adjacent and side-by-side edges of the two portions, which are joined by a pair of respective hinges, generally designated with 10, arranged near the end edges of each portion 8, 9.

The hinges 10, as well as the mutual position between the two portions 8, 9, allow the proximal portion 9 to rotate by 180° with respect to the distal portion 8 without their edges interfering to each other: then, it can be rotated from a folded position, in which a face of the proximal portion 9 is adhered onto the corresponding face of the distal portion 8, and in which the proximal portion 9 can be inserted in the recess 4 by adhering the tray table 1 to the backrest 2 in said hidden position, to an operating position corresponding to a use configuration of maximum extension, in which the faces of the portions 8, 9 are both uncovered, aligned, adjacent and directed upwards, thus forming one single resting plane.

This use configuration of maximum extension also corresponds to the configuration in which the tray table 1 produces its maximum overall dimensions.

In this configuration, the upper face of the distal portion 8, being uncovered and arranged to rest items, comprises at least a first cup-holding cavity 12, which in the present example is single and formed at the end edge.

In this way, if a cup is inserted in this cavity 12, it is however possible, if necessary, to reduce the overall dimensions produced by the tray table: folding upwards, up to 90° about, the proximal portion 9, without it interferes with what is rested upon the distal portion 8.

Snap stops can be provided which keep the proximal portion 9 in erected position with respect to the horizontal distal portion 8.

It is further to be noted that the tray table 1, in configuration adhered onto the backrest 20, occupies on the rear side a reduced overall dimension.

In this regard, the width of the proximal portion 9 is lower than the width of the distal portion; the proximal portion 9 occupies a centred position with respect to the width of the distal portion 8 and then, when the proximal portion 9 is overturned onto the distal portion 8, the proximal portion 8 projects in relief, by occupying only a central area of the distal portion 8.

The width of the proximal portion 9 corresponds to the width of the recess 4 onto the supporting surface, in the drawings the rear surface of a front backrest, and the sizes of the recess 4 are so as to receive inside thereof the whole distal portion 9.

In this way, when the tray table 1 is adhered thereto, the proximal portion 9 inserts in the recess 4: this decreases the perceptible thickness of the tray table 1 on the supporting surface, and locks the tray table in a prefixed position.

Figure 5:
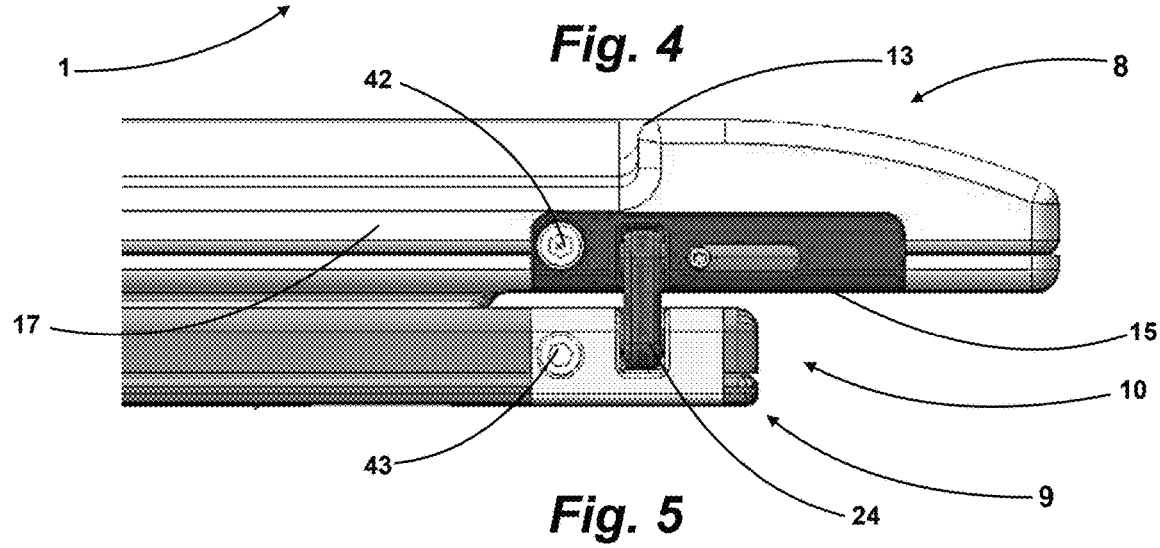
FIG. 5 shows a front view of a detail of the tray table, highlighted by a dotted circle in FIG. 4, in the use configuration with reduced extension.
Figure 6:
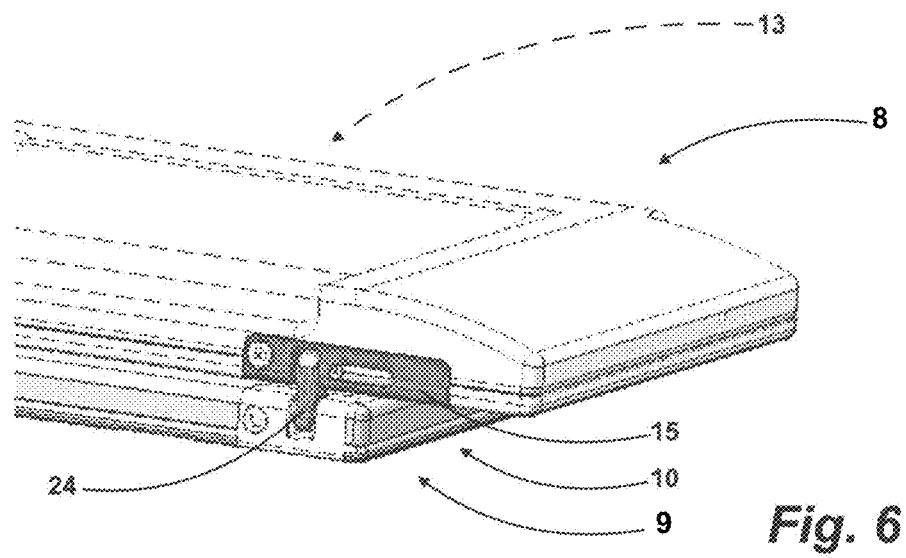
FIG. 6 shows a perspective view of the detail of FIG. 5, in the same configuration.

The distal portion 8 even comprises another face, whereon a cover 13 is positioned which can be removed (FIGS. 5 and 6) and which can receive information or advertisement panels which, in this way, can be easily replaced.

By folding the distal portion 9 upwards in erected position, or by arranging it folded onto the proximal portion 8, in the configuration with reduced overall dimensions, such face results to be immediately visible to the user.

Figure 4:
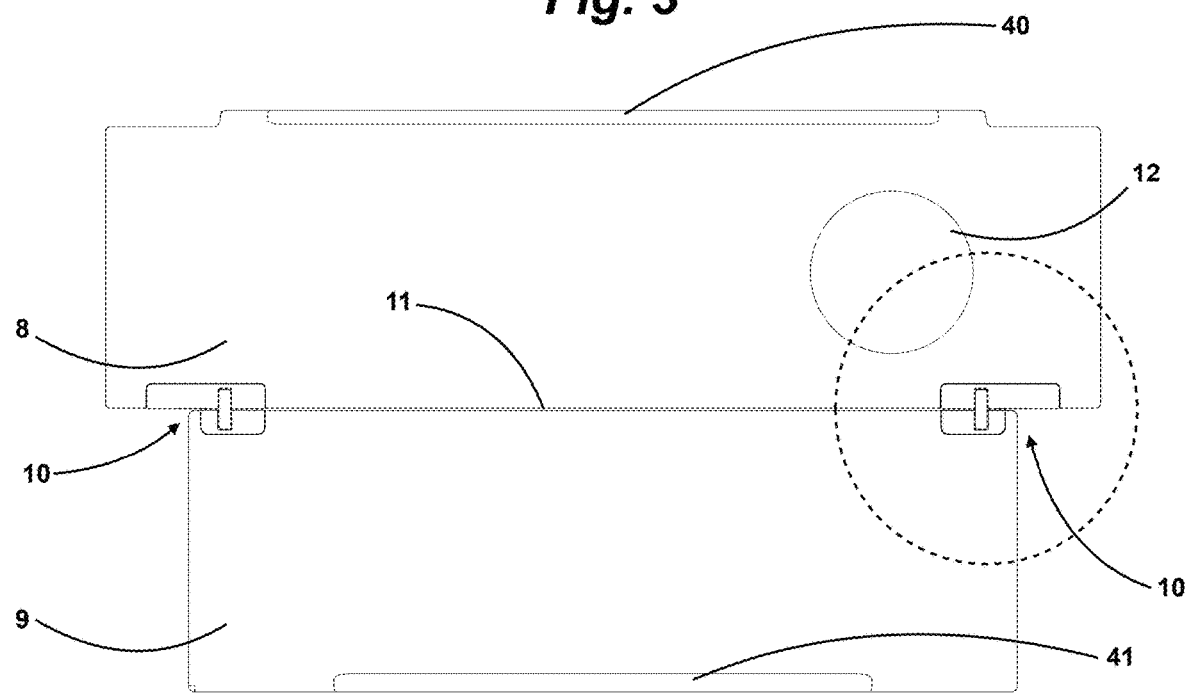
FIG. 4 shows a top plan view of the tray table to the present invention in the according use configuration with the maximum extension.

This face, in the configuration with reduced overall dimensions, then provides an exposed surface 30 which, in the configuration with the maximum extension of FIG. 4 is directed downwards, but can a which assume configuration with reduced overall dimensions (FIG. 9) by rotating the proximal portion 9 on the distal portion 8 when it is in horizontal position.

This procedure makes that the upper distal surface of the distal portion 8 is covered and unusable, since the above-mentioned exposed surface 30 is in a position in which it is directed upwards and acts as resting plane of the tray table 1, by implementing a use configuration with reduced overall dimensions.

Figure 9:
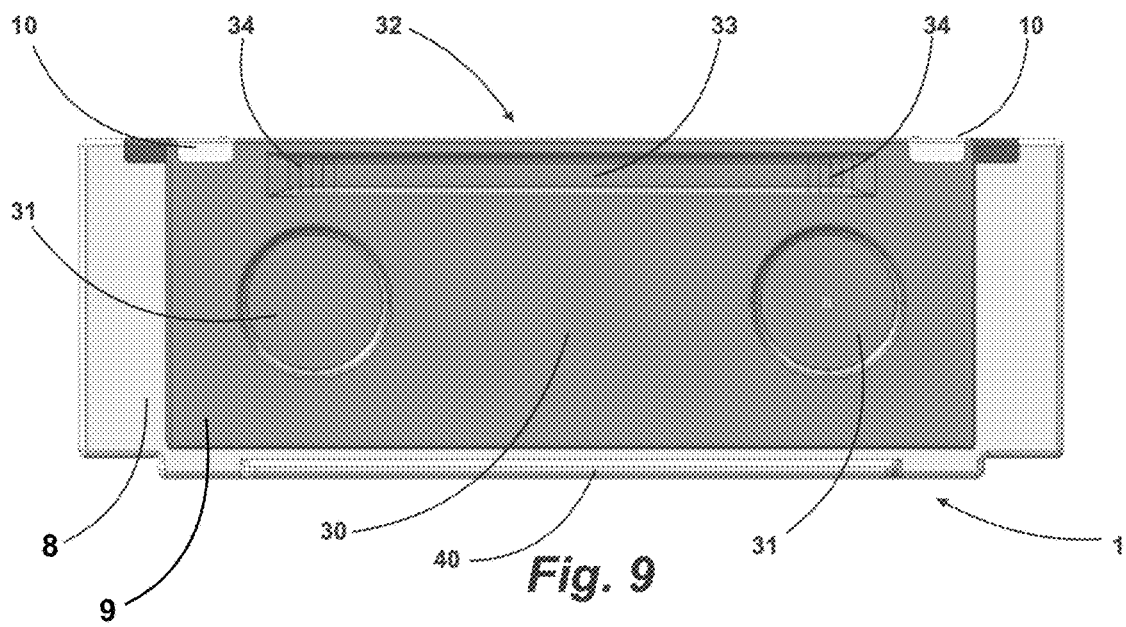
FIG. 9 shows a top plan view of the tray table according to the present invention in the use configuration with reduced extension.

This surface preferably comprises at least a second cup-holding cavity 31, two in the version of FIG. 9, and a support 32 for tablet or smartphone, that is a PED holder, where PED is the acronym of portable electronic device.

The support 32 comprises an elongated guide 33, adapted to receive an edge of tablet or smartphone, which at its own ends comprises snap elastic elements 34, positioned to seize the ends of the edge of the device inserted in the guide 33.

However, it is meant that the support 32 could also have a different shape.

It is positioned near the edges of the portions 8, 9 implementing said separation 11, that is at a certain distance from the surface supporting the tray table, in order to allow the electronic device to be rested with a certain tilting, in a more stable way with respect to the vertical position.

It is further to be noted that the distal upper surface of the distal portion 8 optionally can have a first linear projecting rib 40, running parallel and in proximity to the edge whereon such portion is hinged to the supporting surface, to prevent the objects from falling in the slit which implements beyond the first rib 40.

In the same way, the upper proximal surface of the proximal portion 9, which is directed upwards in the use configuration of maximum extension, can optionally have a second projecting rib 41 running parallel and in proximity to the farthest edge from the supporting surface.

Figure 7:
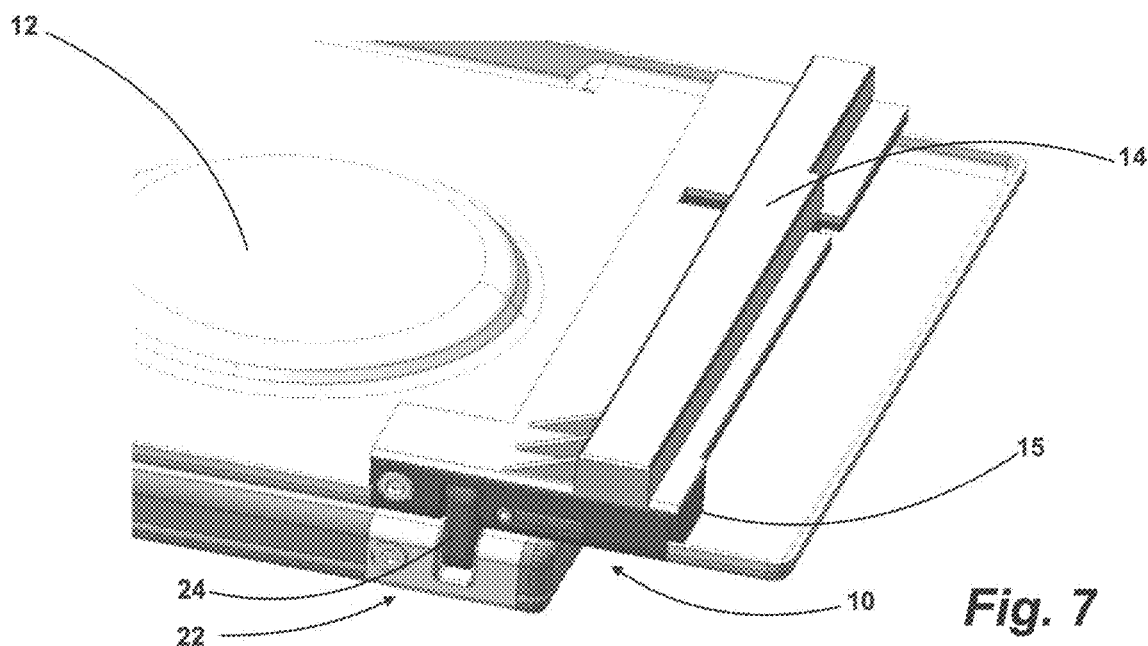
FIG. 7 shows a perspective view of the detail of FIG. 5, in the same configuration, wherein an external portion thereof was removed to illustrate some internal portions thereof.
Figure 8:
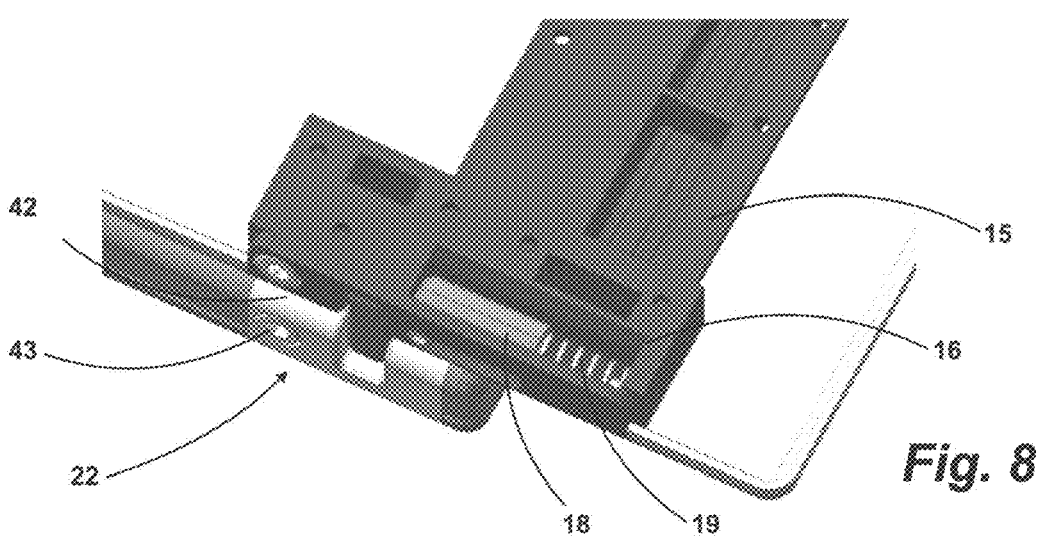
FIG. 8 shows a perspective cross view of the detail of FIG. 5, in the same configuration.

Upon removing the cover 13 (FIG. 7), a covering panel 14 is uncovered, which serves to cover a first insert 15 in which a respective hinge 10 is formed: therefore, the distal portion 9 comprises two covering panels and two first inserts on each end thereof.

The first insert 15, near a distal intermediate margin 17 of the distal portion 9, has a first groove 16 in which a retractable hinge pin 18 is inserted, the position thereof is determined by an elastic element which pushes the pin 18 in a longitudinal direction, in particular a coil spring 19, of linear type, inserted so as to push axially the pin 18 on a counterpart on the opposite end of the groove 16.

The insert 15 and the hinge pin 18 constitute a distal articulation on the distal portion 9 of the tray table 1, whereas the proximal portion 8, at the distal articulation, will have its own proximal articulation, implemented by a second insert generally designated with 22, having a respective second groove 23 with its own (not represented) fixed pin and a hinge element 24 wherein the hinge pin 18 has to be inserted.

At the distal margin 17, which remains uncovered when the two portions 8, 9 are folded over each other, the first insert 15 has a slit 25 allowing to access a section of the hinge pin 18. At this slit 25, the retractable hinge a pin comprises dowel 18 fastening 26 arranged transversely in the pin thickness, inside a respective seat which can be threaded to implement a screw engagement, with an end which can interfere with the internal surface of the groove 16.

The dowel 26 consists of a threaded rod, with a head 27 which can be actuated in rotation with a usual screwdriver, to fix the pin 18 in its operating position in which it is inserted in the hinge element 24 connecting it to the proximal portion 8. The threaded rod, when it s inserted and screwed at the maximum depth, has a fastening end which inserts in a fastening seat 36 formed in the first groove 16.

Figures 10A, 10B:
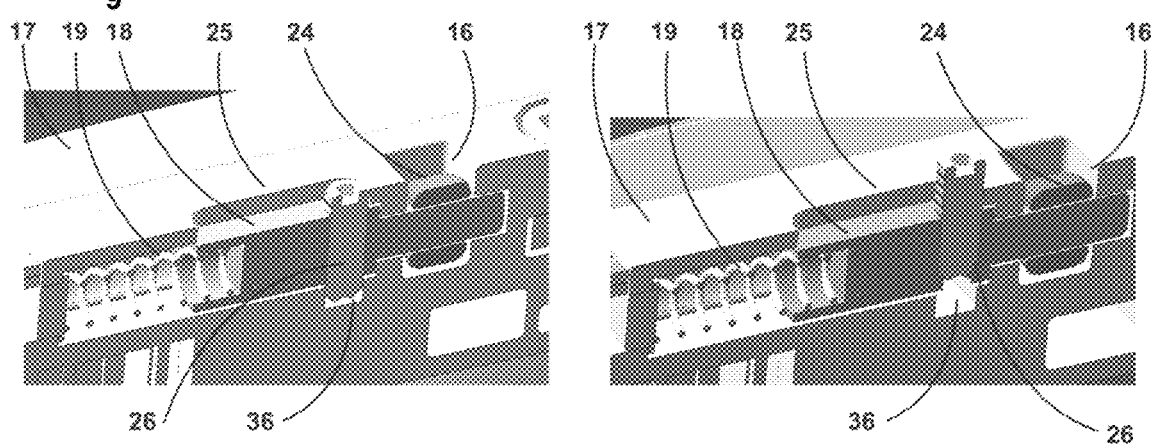
FIGS. 10A, 10B, 10C and 10D show respective perspective views in partial section of the detail of FIG. 5, illustrating the operation thereof.
Figure 10C:
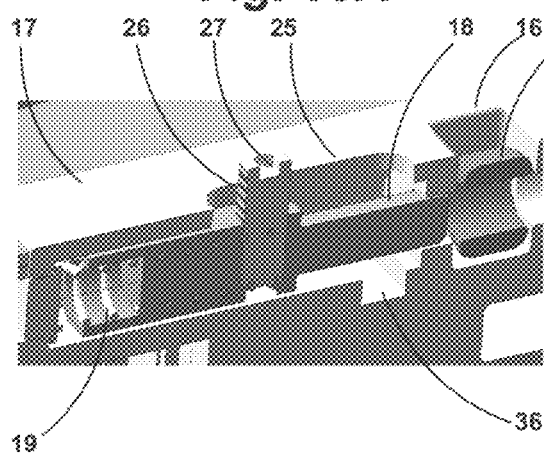

The spring 19 pushes the pin 18 in a position so that the dowel 26 can be fastened thanks to its fastening seat 36 (FIG. 10A). By unscrewing and raising the dowel 26 (FIG. 10B), the interference between the fastening end and the fastening seat 36 stops, and the dowel itself can be used to win the force of the spring 19 and to retract the pin 18 in a position in which it releases from the hinge ring 24 (FIG. 10C).

Figure 10D:
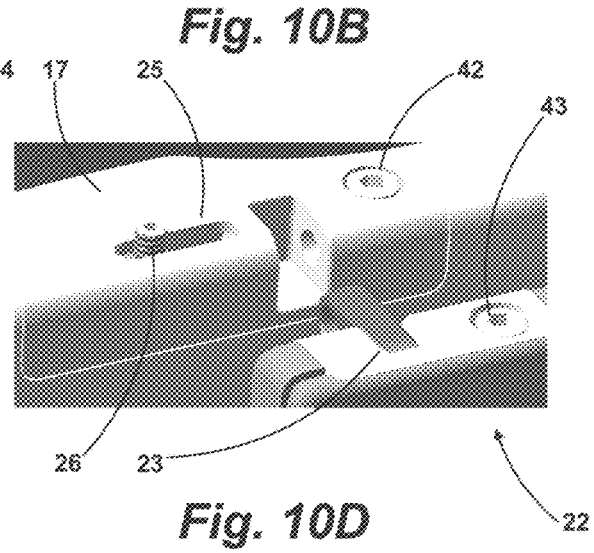

In this position, the two portions 8, 9, that is the two inserts 15, 22, can be separated (FIG. 10D).

Generally, the retractable hinge pins 18 are of the quick release type: they can be unlocked and released from the hinge element 24 with a simple procedure, made easy by that the fact that the pin 18, and in particular the head 27 of the fastening dowel 26, are accessible from the distal margin 17 of the distal portion 9, which remains uncovered when the two portions are folded over each other.

This structure of the hinges 10 then allows to separate quickly the two portions, in order to perform cleaning, maintenance and replacement procedures.

The two above-described inserts 15, 22, forming the hinge 10, are fastened to the respective distal 8 and proximal 9 portions by means of a corresponding first fastening screw 42 and second fastening screw 43.

Even these screws 42, 43 are inserted at the edge of the two portions 8, 9, which is accessible when they are folded over each other, for an easier accessibility. In this regard, the inserts 15, 22 will be positioned at suitable breaks formed in the thickness of the two portions 8, 9.

To the above-described deployable tray table and the seat incorporating it a person skilled in the art, with the purpose of satisfying additional and contingent needs, could introduce several additional modifications and variants, all however comprised within the protective scope of the present invention, as defined by the enclosed claims.

The invention claimed is:

1. A deployable tray table, of the type revolvingly constrained to a support and movable between a horizontal operating position and an upwardly rotated position, which comprises a distal portion, near the support, and a proximal portion which are placed side by side and adjacent to each other with respective adjacent edges of the two portions joined by hinges, so that the proximal portion can rotate by 180° from a folded position in a configuration with reduced overall dimensions, wherein the proximal portion is adhered on a distal upper face of the distal portion, to an extended operating position, wherein the distal and proximal portions have respective faces forming one single plane, said proximal portion comprising an exposed surface which, in the configuration with reduced overall dimensions, is directed upwards and acts as resting plane, wherein each one of said hinges comprise a respective hinge pin inserted in a groove obtained in an insert which is fastened to the distal portion at the edge adjacent to the proximal portion, the hinge pins forming an articulation of said distal and proximal portions and being retractable thereby disengaging and separating the proximal portion from the distal portion.

2. The deployable tray table according to claim 1, wherein said exposed surface has at least a support for a portable electronic device.

3. The deployable tray table according to claim 1, wherein the upper face of the distal portion comprises at least a cup-holding cavity.

4. The deployable tray table according to claim 1, wherein the exposed surface comprises a removable cover positioned thereon.

5. The deployable tray table according to claim 2, wherein said support for a portable electronic device comprises an elongated guide, adapted to receive an edge of the portable electronic device, the elongated guide comprising, at ends thereof, snap elastic elements, positioned to seize the ends of the edge of the portable electronic device inserted in the elongated guide.

6. The deployable tray table according to claim 5, wherein said support for a portable electronic device is positioned near the edges of the portions implementing said separation.

7. The deployable tray table according to claim 1, wherein, in in said extended operating position, the upper surface of the distal portion has a first linear projecting rib running parallel and in proximity to the edge whereon such portion is hinged to the supporting surface, and wherein the upper surface of the proximal portion has a second projecting rib running parallel and in proximity to the farthest edge from the supporting surface.

8. The deployable tray table according to claim 1, wherein the groove includes an elastic element which pushes the hinge pin for insertion in a respective hinge element joined to the proximal portion.

9. The deployable tray table according to claim 1, wherein the hinge pin comprises a fastening dowel, projecting in said groove adapted to engage in a respective fastening seat obtained in said insert, said insert having a slit, arranged at a margin of the distal portion, which, in said configuration with reduced overall dimensions, is accessible, allowing to actuate the fastening dowel.

10. The deployable tray table according to claim 9, wherein said fastening dowel consists of a threaded rod, in a screw engagement in threaded through-hole crossing said hinge pin.

11. The deployable tray table according to claim 9, wherein said fastening dowel is disengaged from the fastening seat so as to be able to be used as manual cursor to win the force of said elastic element and to retract the pin in a position in which the pin is extracted from the hinge element.

12. A seat comprising a backrest the rear surface thereof constitutes the support of a deployable tray table according to claim 1, wherein said rear surface has a recess sized to receive inside thereof the whole distal portion, the width thereof is less than the width of the distal portion; the proximal portion occupying a centered position with respect to the width of the distal portion and projecting therefrom in relief when the proximal portion is overturned onto the distal portion, so that, when the tray table is adhered to the supporting surface, the proximal portion inserts in the recess, by locking the tray table in a prefixed position.

* * * * *